United States Patent [19]

Tsuchiya et al.

[11] 4,430,136
[45] Feb. 7, 1984

[54] PROCESS FOR PREPARING OPEN-CELL STRUCTURE OF VINYL CHLORIDE RESIN

[75] Inventors: Toshio Tsuchiya, Tokyo; Syuichi Moriizumi, Saitama; Hisashi Takeda, Chiba; Akinori Arai, Saitama, all of Japan

[73] Assignee: Lonseal Corporation, Tokyo, Japan

[21] Appl. No.: 410,563

[22] Filed: Aug. 23, 1982

[30] Foreign Application Priority Data

Dec. 15, 1981 [JP]  Japan ................................ 56-202989

[51] Int. Cl.³ .............................................. B29C 19/00
[52] U.S. Cl. .................................. 156/246; 156/289; 427/244; 427/373; 521/73; 521/89; 521/94; 521/145; 521/910; 264/DIG. 5
[58] Field of Search ................. 156/246, 289; 427/244, 427/373; 521/73, 89, 94, 145, 910; 264/DIG. 5

[56] References Cited

U.S. PATENT DOCUMENTS

3,278,466 10/1966 Crom et al. ......................... 521/910
3,645,931 2/1972 Normanton et al. ................ 521/88

FOREIGN PATENT DOCUMENTS

53-21898 7/1978 Japan .
55-137930 10/1980 Japan .
56-70034 6/1981 Japan .
56-90841 7/1981 Japan .

*Primary Examiner*—Morton Foelak
*Attorney, Agent, or Firm*—Sandler & Greenblum

[57] ABSTRACT

A process for preparing an open-cell structure from a vinyl chloride resin. The process includes mixing a vinyl chloride resin, stabilizer, plasticizer, surface active agent, azodicarbonamide and 4,4'-oxybisbenzenesulfonyl hydrazide to form a vinyl chloride resin paste. The vinyl chloride resin paste of step (a) is rendered alkaline, and mixed to form a uniformly-mixed paste. The paste is permitted to expand, and then heated to cause gelation.

22 Claims, 6 Drawing Figures

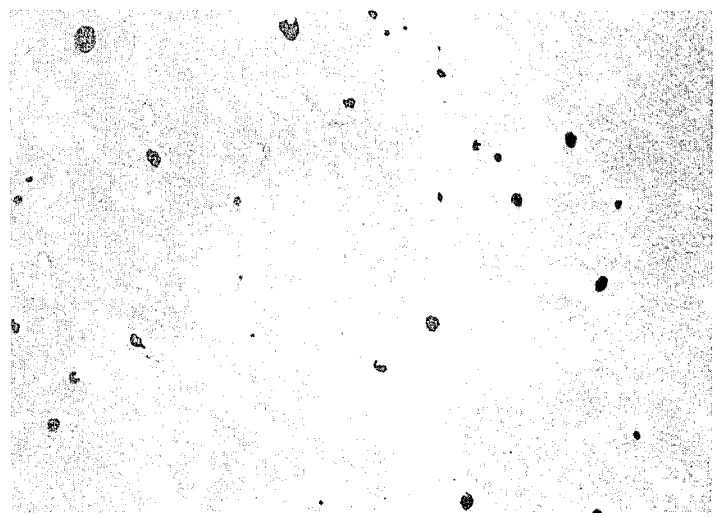
FIG. 1
FIG. 2
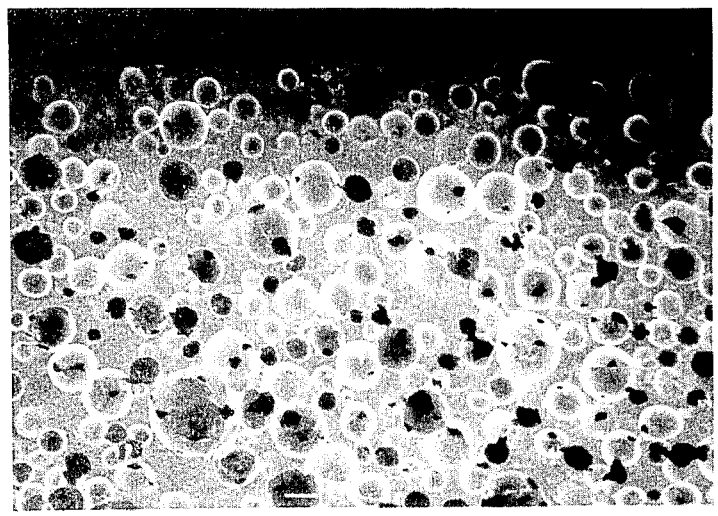

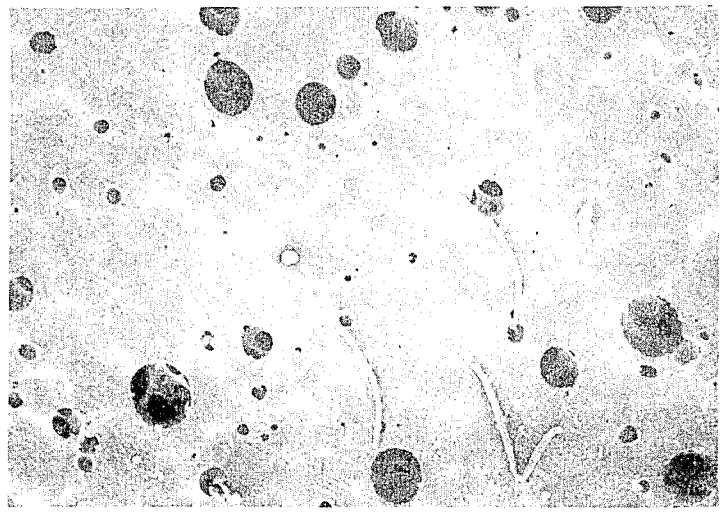
FIG.5
FIG.6
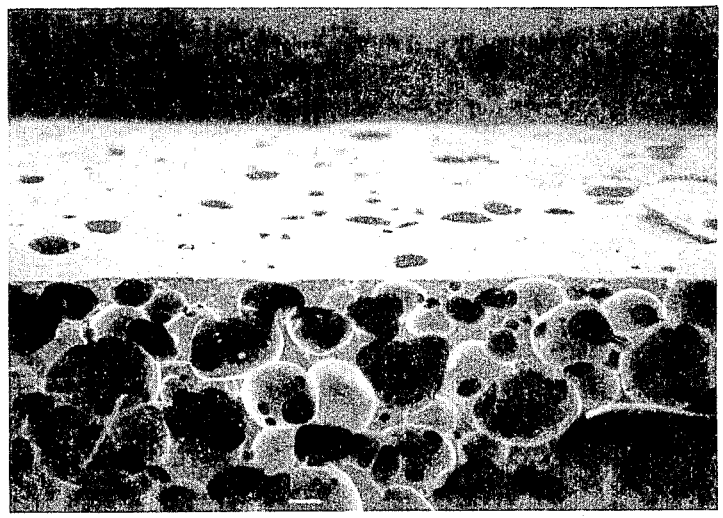

PROCESS FOR PREPARING OPEN-CELL STRUCTURE OF VINYL CHLORIDE RESIN

BACKGROUND OF THE INVENTION

1. Field of the Invention

The present invention relates to a process for preparing an open-cell foam structure of a vinyl chloride resin and, more particularly, to a process of preparing an open-cell foam structure by adding a heat decomposable chemical blowing agent to a vinyl chloride resin paste and subjecting the paste to an alkaline decomposition to expand the paste.

2. Description of Prior Art

Previous processes used in preparing an open-cell foam structure of the vinyl chloride resin type have been of two types. In a first process, a vinyl chloride resin paste is used as a base while according to the second technique, a calendering technique is used. The paste technique is described in Japanese patent application No. 21,898/1978 which discloses coating a mixed paste on a base film. The paste is obtained by adding a wax containing from about 20–80 percent carbon constituents, which is incompatible with the vinyl chloride resin. The vinyl chloride resin paste contains azodicarbonamide (AC), a commonly used blowing agent. The resin itself is prepared by means of an emulsion polymerization method. The mixture is foamed and gelled by heating the mixture in a foaming oven to provide an open-cell structure.

The second technique is described in Japanese Laid-Open patent application Nos. 137,930/1980; 70,034/1981; and 90,841/1981. This technique involves the preparation of an open-cell structure by means of a calendering technique. In this technique, AC is used, as in the previous technique, as a blowing agent, and the technique forms pores by means of the thermal decomposition of the blowing agent.

Both of the above techniques provide large cells at the surfaces of the resulting foam (as is seen in FIGS. 3 and 5 of the instant application) as well as large cells throughout the cross-section of the foam (as shown in FIGS. 4 and 6 of the instant application). Since the foams obtained by these methods also possess thin surface layers, the resultant open-cell foam structures have weak surface strength and poor density at their surfaces such that the resulting materials cannot be used as surface sheet material for automobile seats, upholstery material for chairs, or the like.

A process for obviating the above disadvantages which are inherent in conventional techniques has been proposed by Applicant in Japanese Patent Publication No. 28,933/1981. According to this technique, an open-cell foam structure is prepared by means of alkali decomposition of a vinyl chloride resin paste which contains a blowing agent in the presence of an aqueous alkali solution. In this technique, AC is used alone as a blowing agent. However, when using this technique, a portion of the AC remains undissolved as a residue in the resulting open-cell foam structure which exhibits considerable yellowish coloration and provides an extremely low moisture permeability. An increase in the extent of alkali decomposition can somewhat decrease the yellow discoloration, however, this may cause coarse cells to appear on the surface of the resultant foam, and damage the cell structure throughout the cross-section product.

SUMMARY OF THE INVENTION

It is, therefore, an object of the present invention to provide a process for forming an open-cell vinyl chloride resin material which does not suffer from the yellowish discoloration which has previously been a problem when using alkali decomposition of AC, as is the case, for example, when using the technique of Japanese Patent Publication No. 28,933/1981.

It is a further object of the invention to provide a process for forming an open-cell foam structure whose surface layers provide sufficient surface strength and sufficient density such that they may be used as surface sheet materials for automobile seats, upholstering material for chairs, and the like.

According to the invention a process is provided for preparing an open-cell structure from a vinyl chloride resin in a manner which achieves the above and other objects of the invention. The process comprises the steps of:

(a) mixing a vinyl chloride resin, a stabilizer, a plasticizer, a surface active agent, azodicarbonamide and 4,4'-oxybisbenzenesulfonyl hydrazide to form a vinyl chloride resin paste;

(b) rendering the vinyl chloride resin paste of step (a) alkaline, and mixing the alkaline paste to form a uniformly-mixed paste;

(c) permitting the uniformly-mixed paste of step (b) to expand; and (d) heating the paste of step (c) to cause gelation.

According to one embodiment of the invention the paste formed in step (a) is rendered alkaline by adding an aqueous alkaline solution to the paste. The aqueous alkaline solution is preferably selected from the group consisting of aqueous sodium hydroxide, aqueous potassium hydroxide, and mixtures thereof. In a most preferred embodiment of the invention an aqueous solution of sodium hydroxide is used.

The uniformly-mixed paste may be applied onto a backing prior to heating the expanded paste in step (d). The backing may be made of paper, unwoven fabric, release paper, or the like.

According to one embodiment, the paste is applied to release paper and the opposite side of the paste is laminated onto a permanent backing. The release paper is then removed after gelation is completed.

According to yet another preferred aspect of the invention, the ratio of azodicarbonamide (AC) to 4,4'-oxybisbenzenesulfonyl hydrazide (OBSH) is between about 1:0.5 to about 1:2.0.

The article formed by the process of the invention exhibits the desirable color, strength and texture properties which are desired.

BRIEF DESCRIPTION OF DRAWINGS

FIG. 1 is a microphotograph of the top of an open-cell structure obtained according to the process of the present invention;

FIG. 2 is a cross-sectional view of the open-cell foam structure of FIG. 1;

FIG. 5 is a microphotograph of the top of the open-cell foam structure obtained using a conventional calendering process; and FIG. 6 is a cross-sectional view of the open-cell foam structure of FIG. 5.

DESCRIPTION OF PREFERRED EMBODIMENTS

Figure 3:
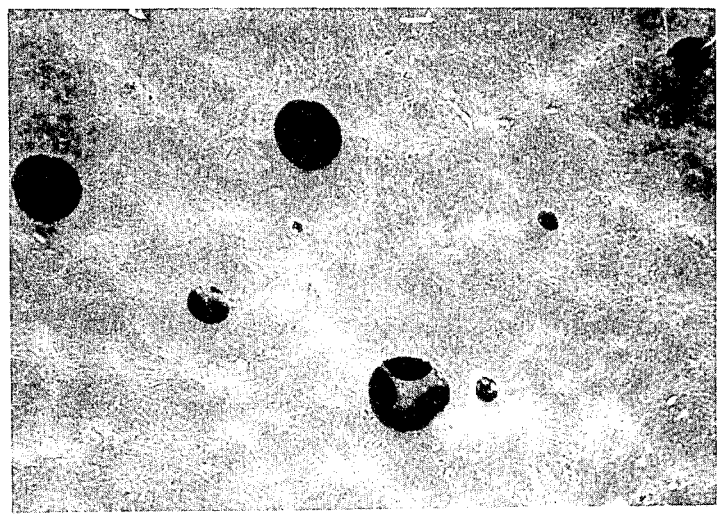
FIG. 3 is a microphotograph of the top of an open-cell foam structure obtained using a conventional paste process.

As has been noted previously, the present invention is an improvement in the invention described in Japanese Patent Publication No. 28,933/1981. The process of the present invention is characterized in that a blowing agent which comprises both AC and 4,4'-oxybisbenzenesulfonyl hydrazide (OBSH) is added to a formulation which comprises a conventional stabilizer and plasticizer as well as a small amount of a surface active agent in combination with a vinyl chloride resin paste. An aqueous alkali solution such as an aqueous solution of sodium hydroxide is added to the vinyl chloride resin paste which is mixed so as to result in a uniformly-mixed paste. According to the process of the invention, the uniformly-mixed paste is then coated onto a backing such as a paper, unwoven fabric or the like, or onto releasing sheet, or by filling the uniformly-mixed paste into a mold. The applied paste is then heated in an oven so as to cause gelation.

As was noted previously, the process of the invention relies upon a combination of two kinds of blowing agents, i.e., AC and OBSH so as to result in an extremely favorable effect when preparing the open-cell foam structure by means of the alkali decomposition technique.

In the prior art technique wherein AC is used alone, a stabilizer of the Na-Zn series such as Mark-FL-23 (manufactured by Adeka Arrgus K.K.) is effective as a stabilizer to be mixed in the paste, while a general stabilizer such as that of the Ba-Cd series; or of the Sn series; or of the Ba-Zn series, can be used so as to result in stable alkali decomposition. However, these materials result in defects when the cells are coarser and undissolved residues of AC remain in larger amounts.

When AC is used in admixture with OBSH according to the processes of the invention, a stabilizer of the Ba-Cd series such as Advastab BC-1000J (manufactured by Katsuta Kako K.K.) or the like may be used. Additionally, and/or alternatively, a stabilizer of the Ba-Zn series such as Advastab ABC-1J or the like (manufactured by Katsuta Kako K.K.) or of the Sn series such as Advastab T-12PS (manufactured by Katsuta Kako K.K.) or the like can be used without any difficulty. The ability to use such stabilizers is extremely advantageous from the point of view of preparation of the paste.

As was noted previously, the use of AC alone results in strong yellow discoloration. AC alone gives a color tone of 7.5 Y9/2 on the Munsell scale, while the use of AC in combination with OBSH provides a color tone of 7.5 Y9/1.5, and increases the appearance of whiteness to a remarkable extent, resulting in a color difference $\Delta E$ amounting to as much as 3.5. An increase in the degree of whiteness is advantageous in adjusting the whiteness of the resultant product and is also extremely effective in promoting light resistance, weathering and thermal stability of the resultant product.

Where AC is used alone, the moisture permeability rating under JIS K-6549 designated as "Test Procedures for Vapor Permeability of Leather" is 1.5–1.9 mg/cm² hr which is far below the value of leather which is 7.0–8.0 mg/cm² hr. Where AC is used in combination with OBSH, moisture permeability rises to 6.0–6.5 mg/cm² hr and becomes very close to the vapor permeability value of leather.

Likewise, when comparing gas permeability using the process of the invention with prior techniques, one is able to achieve far more desirable results. Thus, when performing gas permeability tests under JIS L-1004 designated as "Test Procedures for Cotton Fabric", the gas permeability when using AC alone is extremely low and ranges from 0.5 to 0.8 $cm^3 cm^{-2} sec^{-1}$, while the gas permeability which is achieved when using AC in combination with OBSH is 2.0 $cm^3 ; cm^{-2} ; sec^{-1}$ or greater.

It is only as a result of using the process of the invention that the above advantages are achieved, which advantages could not be achieved when using AC alone.

The vinyl chloride resin paste used in the present invention includes resin pastes conventionally provided by emulsion polymerization techniques as well as resins obtained by microsuspension processes. Furthermore, the resin may comprise emulsion polymerization resins in combination with microsuspension resins. Additionally, the vinyl chloride resins may be either homopolymers or copolymers and substantially the same results can be achieved using both types of resins so that the resins may be selected depending upon use considerations.

The plasticizer contemplated according to the invention is a plasticizer which is primarily of the phthalic acid ester type. Such a plasticizer may be used in combination with a polymeric plasticizer, or a plasticizer of the phosphoric ester type or the like. In order to improve fire retardancy, it is possible to use a secondary plasticizer such as a chlorinated paraffin or the like.

Fillers such as fine silica power, calcium carbonate, or the like may be added as desired in order to provide the desired feel and texture as well as to reduce costs.

While the relative ratios of AC and OBSH are important, the material which is predominantly controlling in the formation of the open-cell structure is AC. Thus, it is preferred that the amount of AC to be used range from about 2 to about 6 PHR (PHR being defined as parts by weight of AC with respect to 100 parts by weight of the vinyl chloride resin) so as to provide the desired moisture and gas permeabilities. It is furthermore necessary to vary the amount of OBSH as a function of the amount of AC which is used. Thus, the preferred ratio of AC to OBSH varies from about 1:0.5 to about 1:2.0.

Where the amount of OBSH with respect to the amount of AC is smaller than the preferred ratio, alkali decomposition of AC does not proceed in a smooth manner and the resultant product exhibits yellowish coloration, and a product having a moisture permeability of about 2.0 to about 2.5. This value is somewhat higher than that which is obtained using AC alone, but the resultant product is not appropriate for use as an interior material for automobiles or the like. Where the amount of OBSH with respect to the amount of AC is larger than the ratio set forth above, the whiteness of the resultant product resembles a snow-white color; however, a large number of spots of swollen portions are formed on the surface of the product, or the surface layer of the product tends to lift up and be separated from the remainder of the product. Accordingly, it is preferable to operate within the preferred ratios set forth herein when practicing the process in accordance with the present invention.

The amount of surface active agent to be used is an important aspect of the present invention. The surface active agent serves, in the present invention, to disperse and mix the aqueous alkali solution such as an aqueous solution of sodium hydroxide or the like, in the vinyl chloride resin paste in a homogeneous and stable manner. Accordingly, any surface active agent of the type suitable to achieve this purpose may be employed. For example, an anionic surface active agent may be of the alkyl sulfate type, of the alkyl benzenesulfonate type or the like. A cationic surface active agent may be used of the quarternary ammonium salt type, or the like; and/or a non-ionic surface active agent may be used of the polyoxyethylene alkyl ether type, of the polyoxyethylene aliphatic acid ester type or the like. Finally, an amphoteric surface active agent may be used of the betaine type such as, for example, lauryl betaine or stearyl betaine.

The alkaline compound to be used for purposes of achieving alkaline decomposition of AC and OBSH is any composition which provides the desired alkalinity in the composition. Such as result may be achieved either by a compound which is itself alkaline and/or by a compound that is alkaline when in aqueous solution. More specifically, a strongly alkaline compound such as sodium hydroxide, potassium hydroxide or the like may be added to the formulation in the form of an aqueous solution in an amount of approximately 1:5 to 1:1 with respect to the solid content of AC by weight.

Other alkaline compounds such as an organic compound such as dithioltriazine sodium salt or the like results in an alkaline condition when in an aqueous solution, and is thus also effective as the alkaline compound to be used in the present invention. When using such a compound it may be added in a ratio of 1:1–1:4 with respect to the amount of AC which is present by weight. The alkaline aqueous solutions may be mixed in an extremely smooth manner as a result of the surface active agent previously referred to so as to result in a homogeneous mixture.

When the alkaline compound is to be used as well as the surface active agent, it is important that compatibility and selectivity between the two materials be kept in mind. Thus, it should be experimentally determined which alkali compounds can be suitably used in combination with a particular surface active agent and vice versa. For purposes of compatibility, sodium hydroxide is most generally preferred.

Figure 4:
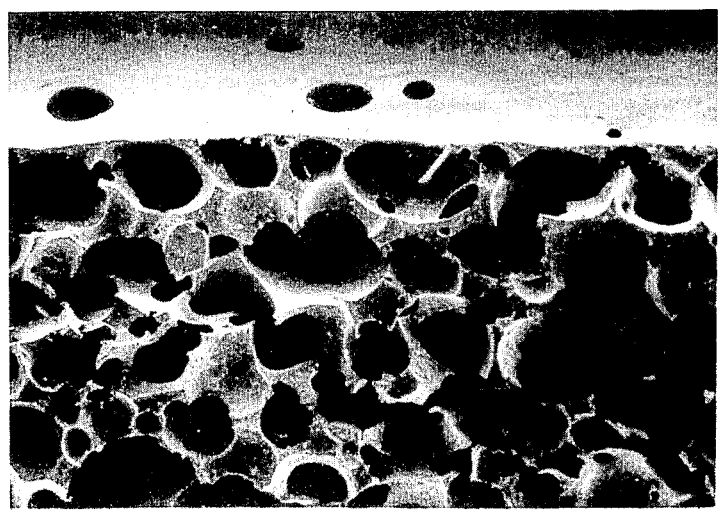
FIG. 4 is a cross-sectional view of the open-cell foam structure of FIG. 3.

The open-cell structure which is prepared according to the process of the invention possesses spherical cells throughout the thickness of the sheet and fine open cells on the surface of the sheet as may be seen from FIGS. 1 and 2. A comparison of FIGS. 3–4 and 5–6 indicates that the wear resistance of the open-cell structure of the invention is high and that the cells are closely spaced.

BEST MODE OF PERFORMING THE INVENTION

According to one preferred embodiment of the invention, the mixed paste formed of the vinyl chloride resin, AC, OBSH, alkali composition etc., is coated on a backing such as paper, woven fabric, raised cloth, unwoven fabric or knitted cloth, or the like, and is then subjected to alkali decomposition on the backing so as to provide open-cells which give a synthetic leather appearance. When an aqueous solution of sodium hydroxide is added to a mixed paste containing AC and OBSH, the alkali decomposition reaction immediately begins generating decomposed gases and results in a gradual increase in the overall volume of the paste. The volume is increased by about 10 percent in about 5 minutes after the aqueous solution of sodium hydroxide is added and stirred. After the volume of the paste has increased by about 10 percent, the paste can be coated onto the backing and the viscosity of the paste gradually increases at this point such that excess impregnation into the backing can be avoided. The mixed paste is then coated onto the backing so as to have a thickness of about 0.5 mm, and the coated backing is then moved for 2–3 minutes and then introduced into a heating oven at a temperature of about 150°–180° C. in which gelation is initiated and the resulting open-cell structure becomes solidified. The open-cell structure is then cooled to give a vinyl chloride leather having favorable gas and moisture permeability.

According to a most preferred embodiment of the present invention, the mixed paste is coated onto a release paper having a embossed pattern, and the paste coating is laminated onto a backing as was mentioned above after travelling for an appropriate time. The laminated product is then introduced into a heating oven for gelation and the release paper is removed after cooling. Using this technique, the paste coated on the release paper has a dense skin layer on the surface thereof that was previously in contact with the release paper. The upper surface of the paste which is laminated onto the backing has a larger number of open-cells resulting from the alkali decomposition. As a result of using this technique, the resulting vinyl chloride leather has high strength and favorable gas and moisture permeability.

According to yet another embodiment of the present invention, the mixed paste is charged into a mold having a suitable shape and is then gelled upon the application of heat. Using this method, a molded product is provided which has a favorable gas and moisture permeability which is suitable for the preparation of cushion bodies for seats.

EXAMPLES

EXAMPLE 1

| | |
|---|---|
| Zeon 25*[1] (P = 900) | 100 parts by weight |
| DOP | 65 parts by weight |
| Epoxidized soybean oil | 2 parts by weight |
| Mark FL-23*[2] | 3 parts by weight |
| AC | 4 parts by weight |
| OBSH | 4 parts by weight |
| Heavy Calcium Carbonate | 10 parts by weight |
| Emal NC*[3] | 1 part by weight |
| Pigment | Suitable amount |

*[1] Paste grade PVC resin, by Nippon Zeon Co., Ltd.
*[2] Na—Zn type powder stabilizer, Adeka Argus Co., Ltd.
*[3] Amionic Surface active agent, KAO Soap Co., Ltd.

The above composition is mixed in a Sigma grade model mixer to give a homogeneous paste. Five parts by weight of a 20 percent sodium hydroxide aqueous solution is then added to the paste and the mixture is mixed for 3–5 minutes. Immediately thereafter, the mixed paste is coated on a release paper with a white-spotted pattern using a doctor blade process so as to give a coating having a thickness of 0.6 mm. After being left to stand for about 2 minutes, the coating is laminated with a double-sided knit cloth and gelled at 150° C. for 2 minutes, and then further gelled at 170° C. for 1 minute. The release paper is then removed to give a vinyl chloride leather which exhibits an extremely favorable moisture permeability of 6.7 mg/cm$^2$ hr when measured using JIS K-6549 "Test Procedures for Moisture Permeability of Leather".

For purposes of comparison, a procedure according to Example 1 is followed with the exception that no OBSH is used. The moisture permeability of the resulting vinyl chloride leather is 1.6 mg/cm$^2$ hr. A color difference between the vinyl chloride leathers obtained in Example 1 and in the comparison test is shown in Table 1.

TABLE 1

| Data | | Example 1 | Comparative Example 1 |
|---|---|---|---|
| Difference in color | X | 75.6 | 74.7 |
| | Y | 79.6 | 78.4 |
| | Z | 71.7 | 66.5 |
| | Munsell | 7.5 Y 9/1.5 | 7.5 Y 9/2 |
| | ΔL | 89.4 | 88.6 |
| Color difference | Δa | −4.1 | −4.1 |
| | Δb | 14.5 | 17.9 |
| Total Color difference | ΔE | | 3.5 |

X, Y, Z, ΔL, Δa, Δb, and ΔE, are used here in accordance with ASTM D 2244 Standard Method for Instrument Evaluation of COLOR DIFFERENCES OF OPAQUE MATERIALS

EXAMPLES 2–8

Examples 2–8 illustrated in Table 2 illustrate differences which result as a function of varying the ratio of AC to OBSH.

TABLE 2

Examples 2–8 (parts by weight)

| Composition | Examples | | | | | | |
|---|---|---|---|---|---|---|---|
| | 2 | 3 | 4 | 5 | 6 | 7 | 8 |
| Zeon 25 | 100 | 100 | 100 | 100 | 100 | 100 | 100 |
| DOP | 60 | 60 | 60 | 60 | 50 | 50 | 50 |
| Epoxidized soybean oil | 3 | 3 | 3 | 3 | 3 | 3 | 3 |
| Mark FL-23 | 3 | 3 | 3 | 3 | — | — | — |
| ABC-1J*[4] | — | — | — | — | 3 | — | — |
| T-12PJ*[5] | — | — | — | — | — | 4 | — |
| BC-1000J*[6] | — | — | — | — | — | — | 4 |
| AC | 4 | 2 | 4 | 3 | 3 | 4 | 4 |
| OBSH | 3 | 3 | 1.5 | 6 | 4 | 3 | 3 |
| Emal NC | 1 | 1 | 1 | 1 | 1 | 1 | 1 |
| Pigment | Suitable amount | Suitable amount | Suitable amount | Suitable amount | Suitable amount | Suitable amount | Suitable amount |
| Moisture Permeability | 6.3 | 6.0 | 1.4 | 6.8 | 6.5 | 6.0 | 6.2 |

*[4]Ba—Zn type liquid stabilizer, Katsuta Kako K.K.
*[5]Sn type liquid stabilizer, Katsuta Kako K.K.
*[6]Cd—Ba type liquid stabilizer, Katsuta Kako K.K.

Five parts by weight of a 15 percent sodium hydroxide aqueous solution is added to each of the compositions of Table 2 and the procedures of Example 1 are followed to give a vinyl chloride leather.

Referring to Example 4, wherein the AC:OBSH weight ratio is below than 1:0.5, as a result of the low amount of OBSH present, the moisture permeability of the resultant product is radically decreased.

Examples 5–8 indicate that variation of the stabilizer used affects moisture permeability.

In Example 5, the AC:OBSH ratio is 1:2 and results in a moisture permeability of 6:8. This illustrates that a greater amount of OBSH increases the moisture permeability when compared to the moisture permeability of Example 2 which is 6.3.

EXAMPLE 9

| ZEON 25 | 100 parts by weight |
|---|---|
| DOP | 45 parts by weight |
| TCP | 10 parts by weight |
| Paraffin chloride | 10 parts by weight |
| Epoxidized soybean oil | 3 parts by weight |
| Mark FL-23 | 3 parts by weight |
| AC | 4 parts by weight |
| OBSH | 4 parts by weight |
| Sb$_2$O$_3$ | 5 parts by weight |
| Heavy calcium carbonate | 10 parts by weight |
| Emal NC | 1 part by weight |
| Pigment | Suitable amount |

The composition is treated in the same manner as in Example 1 to give a homogeneous paste, and 7 parts by weight of a 15 percent sodium hydroxide aqueous solution are added thereto. After being mixed for 3–5 minutes, the resultant paste is coated on a fire-retardant paper having a weight of 80 grams/m$^2$ and a thickness of 0.2 mm. The resulting product is then conveyed for 5 minutes and then placed into a heating oven in which the product is heated continuously for 150° C. for 2 minutes and at 160° C. for 1 minute. Immediately after removal from the heating oven, the material is pressed through an embossing machine having a clearance of 0.30 mm to provide the coated surface with a textured pattern. The resulting product possesses good moisture absorption and is suitable for wall paper used to prevent dew condensation.

EXAMPLE 10

| Zeon 25 | 100 parts by weight |
|---|---|
| DOP | 60 parts by weight |
| Epoxidized soybean oil | 3 parts by weight |
| Mark FL-23 | 3 parts by weight |
| AC | 4 parts by weight |
| OBSH | 6 parts by weight |
| Emal NC | 1 part by weight |

The above composition is treated in the same manner as in Example 1 to give a homogeneous paste. 7 parts by weight of a 20 percent sodium hydroxide aqueous solution is added to the paste and the mixture is mixed for 10 minutes. The paste is then charged into a mold to form an arm rest such as is used in an automobile. The mold has an engraved leather pattern and the mixture is heated in a heating furnace at 160° C. for 20 minutes. After demolding, an arm rest is provided having a leather pattern on the surface thereof as well as a soft feel.

Although the invention has been described with reference to particular means, materials and compositions, it is to be understood that the invention is not limited to the particulars disclosed but extends to all equivalents falling within the scope of the claims.

What is claimed is:

1. A process for preparing an open-cell structure from a vinyl chloride resin, said process comprising the steps of:
   (a) mixing a vinyl chloride resin, stabilizer, plasticizer, surface active agent, azodicarbonamide and 4,4'-oxybisbenzenesulfonyl hydrazide to form a vinyl chloride resin paste;
   (b) rendering the vinyl chloride resin paste of step (a) alkaline, and mixing the alkaline paste to form a uniformly-mixed paste;
   (c) permitting said uniformly-mixed paste of step (b) to expand; and
   (d) heating said paste of step (c) to cause gelation.

2. The process as defined by claim 1 comprising rendering said paste of step (a) alkaline by adding an aqueous alkaline solution to said paste of step (a).

3. The process as defined by claim 2 wherein said aqueous alkaline solution is selected from the group consisting of aqueous sodium hydroxide, aqueous potassium hydroxide, and mixtures thereof.

4. The process as defined by claim 3 wherein said aqueous alkali solution is sodium hydroxide.

5. The process as defined by claim 1 further comprising coating said uniformly-mixed paste onto a backing prior to heating said expanded paste in step (d).

6. The process as defined by claim 5 wherein said backing is paper.

7. The process as defined by claim 5 wherein said backing is unwoven fabric.

8. The process as defined by claim 5 wherein said backing is release paper.

9. The process as defined by claim 8 further comprising laminating the side of said expanded paste which is not applied to said release paper onto a permanent backing.

10. The process as defined by claim 1 wherein the ratio of azodicarbonamide to 4,4'-oxybisbenzenesulfonyl hydrazide is between about 1:0.5 to about 1:2.0.

11. The process as defined by claim 1 comprising molding said paste of step (c) in a mold.

12. The process as defined by claim 1 wherein said plasticizer is selected from the group consisting of phthalic acid ester, phosphoric acid ester.

13. The process as defined by claim 12 further comprising adding a secondary plasticizer.

14. The process as defined by claim 13 wherein said secondary plasticizer is a chlorinated paraffin.

15. The process as defined by claim 1 wherein said surface active agent is anionic.

16. The process as defined by claim 15 wherein said anionic surface active agent is selected from the group consisting of an alkyl sulfate, alkyl benzenesulfonate, or mixtures thereof.

17. The process as defined by claim 1 wherein said surface active agent is cationic.

18. The process as defined by claim 17 wherein said cationic is a quaternary ammonium salt.

19. The process as defined by claim 1 wherein said surface active agent is non-ionic.

20. The process as defined by claim 19 wherein said non-ionic surface active agent is selected from the group consisting of polyexyethylene alkyl ether, polyoxyethylene aliphatic acid ester, or mixtures thereof.

21. The process as defined by claim 1 wherein said surface active agent is amphoteric.

22. The process as defined by claim 21 wherein said amphoteric surface active agent is selected from the group consisting of lauryl betaine, stearyl betaine, or mixtures thereof.

* * * * *